Aug. 11, 1942.  P. W. KLIPSCH  2,293,024
METHOD OF ELECTRICAL PROSPECTING
Filed Feb. 5, 1940   3 Sheets-Sheet 1

Paul W. Klipsch
INVENTOR.
BY Jesse R. Stone
Lister B. Clark
ATTORNEYS.

Paul W. Klipsch
INVENTOR.
BY Jesse R Stone
Lester B Clark
ATTORNEYS

Aug. 11, 1942.  P. W. KLIPSCH  2,293,024
METHOD OF ELECTRICAL PROSPECTING
Filed Feb. 5, 1940   3 Sheets-Sheet 3
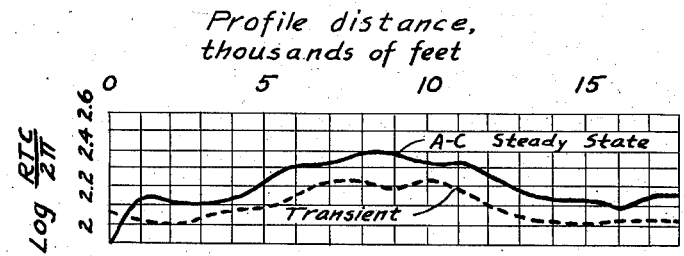
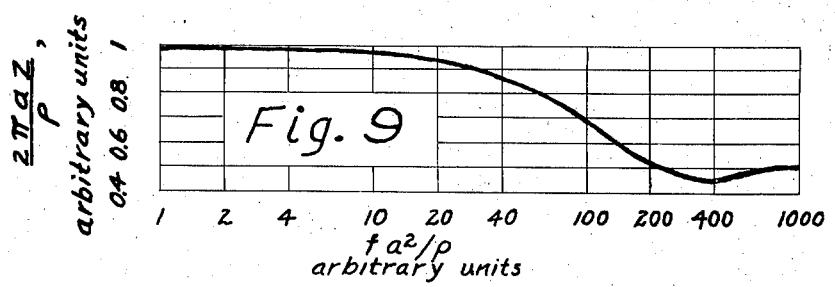
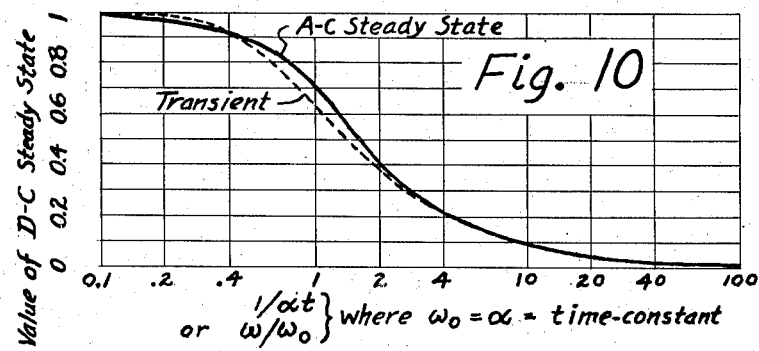
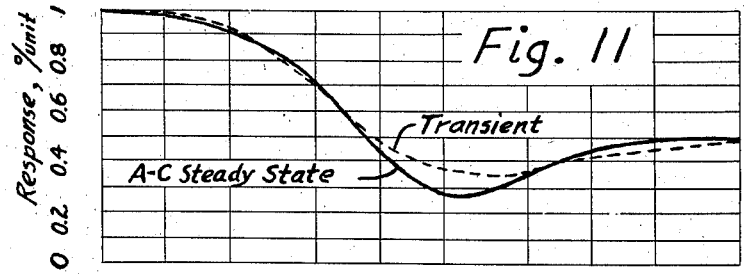
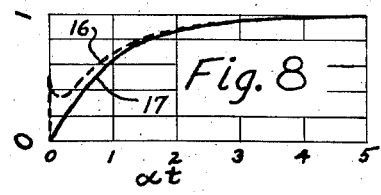
Paul W. Klipsch
INVENTOR.
Jesse R Stone
Lister B Clark
BY
ATTORNEYS Patented Aug. 11, 1942

2,293,024

UNITED STATES PATENT OFFICE 2,293,024

METHOD OF ELECTRICAL PROSPECTING

Paul W. Klipsch, Houston, Tex., assignor to Esme E. Rosaire, Houston, Tex.

Application February 5, 1940, Serial No. 317,261

12 Claims. (Cl. 175—182)

This invention relates to geophysical exploration by measuring certain electrical properties of the earth's crust exhibited under certain states of excitation.

An object of the invention is to determine the point-to-point variation on the earth's surface of an electrical property of the earth which varies with a factor related to time.

In the electrical transient method of prospecting proposed by Blau in U. S. Patent 1,911,137, it was proposed to note the change of potential with respect to time as the result of a suddenly applied steady current. In various subsequent patents and publications, it has been shown that a quantity susceptible to measurement in the transient prospecting technique is the time-constant or some quantity related thereto. For example, Saibara et al., in U. S. Patent 2,177,346, disclose a simplified method of determining such a time constant.

K. E. Gould has treated some aspects of the relation between alternating current steady state response and transient response of the earth in a paper "Coupling between parallel earth-return circuits under D. C. transient conditions" published in Electrical Engineering, September 1937, page 1159.

Unfortunately the function which would be necessary to describe the transient response at any given location on the earth's surface would ordinarly be quite complicated, the number of terms in some cases being quite large. Usually, however, it occurs that one of the transient terms predominates, and the time-constant of this single term is used to express the transient property of the earth. Also, the shape of the frequency response curve or curve of amplitude against frequency generally displays a typical characteristic, and from such characteristic the time-constant may be computed. Equivalent electrical circuits have been devised to nearly duplicate the shape of potential transients due to suddenly applied direct currents and have been disclosed in copending application 226,668 filed Aug. 25, 1939, now Patent No. 2,230,803 of February 4, 1941. Obviously such circuits can be solved for frequency response as well as time constants, so that there exists a practical link between the transient and alternating current steady state performance.

The relation beween steady state and transient phenomena is well established. For any linear circuit, for example, determination of the transient response from the alternating current steady state response may be accomplished by using Equation 405 of "Operational Circuit Analysis" by V. Bush, John Wiley and Sons, 1932. The reverse procedure of determining the alternating current steady state response from the transient response is effected by use of Equation 115 in the same treatise.

Besides the work of Gould mentioned above in treating the earth as a transmission network between generation and detection areas, the recent work of White is cited (G. E. White, "Application of Rapid Current Surges to Electric Transient Prospecting," American Institute of Mining and-Metallurgical Engineering, Technical Publication 1216, February 1940). Reference is also made to "A note on the relation of suddenly applied direct current earth transients to pulse response transients," Geophysics IV, October 4, 1939. In the Geophysics article mention is made (page 281) to the relation between the alternating current steady state and the transient. The results shown in the former paper prove that the mathematical processes relating various types of response, as for example the short impulse transient to the direct current transient, are as applicable to the earth as to a conventional circuit.

Thus, further objects of the invention are to determine the time-constant of the earth by alternating current, steady-state electrical measurements and to determine quantities related to the time-constant as, for example, the reciprocal-time-constant which has the dimension of frequency, and apparent resistivities and mutual impedances at such frequencies that they show greater contrast and have better prospecting value than the resistivity determined at zero frequency or direct current.

A further object is to furnish a method of prospecting having a high contrast by using alternating current frequencies which are optimum with respect to the resistivity of the area to be surveyed.

Another object is to gain high contrast by using optimum geometry of electrode spacing for the available frequency range with a given resistivity range in an area to be prospected.

These and other objects will be apparent from the specification taken in connection with the accompanying drawings in which:

Fig. 6 shows the reciprocal-time-constant in frequency units determined by transient and steady state methods;

Fig. 8 shows two typical earth current transients;

Fig. 9 shows the type of mutual impedance-frequency curve obtainable under certain arbitrary conditions; and Figs. 10 and 11 show the transient responses of Fig. 8 replotted to a logarithmic inverted time scale along with the magnitude of the frequency response corresponding to the respective transients, with the same logarithmic inverted time scale corresponding to frequency.

Figure 1:
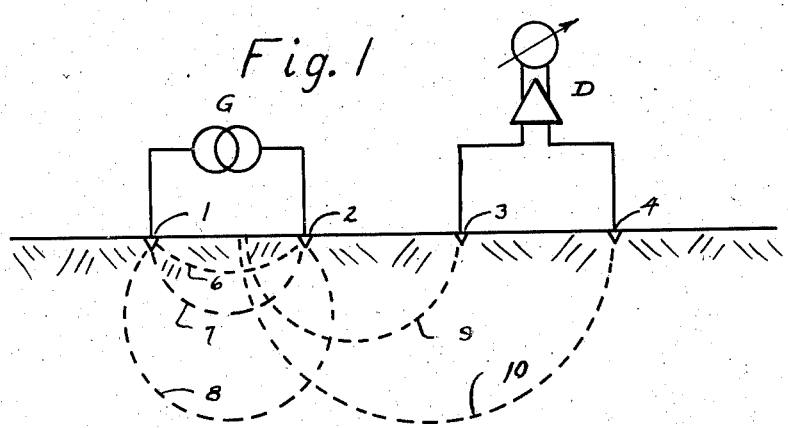
Fig. 1 shows a preferred layout on the earth's surface for measuring the various electrical quantities, and is a vertical section of the earth's surface.

In Fig. 1, electrodes 1, 2, 3 and 4 are embedded in the earth's surface, and current of known value is applied by means of generator G to electrodes 1 and 2. Lines of current flow are indicated at 6, 7 and 8. For conditions of near zero frequency, equipotential surfaces exist, the vertical traces of which are shown as 9 and 10. It is the potential between these surfaces which is measured by potential detecting and measuring instrument D.

Figure 2:
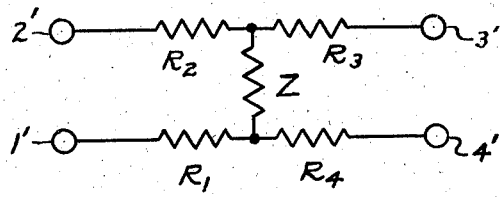
Fig. 2 shows an equivalent circuit of the earth as a four terminal impedance.

In Fig. 2 is shown a four terminal network which is the equivalent of the prospecting circuit of Fig. 1 in which $R_1$, $R_2$, etc. represent the electrode resistances of electrodes 1, 2, 3, and 4 of Fig. 1 and Z is the mutual impedance which may be regarded as the impedance contained between the surfaces represented by traces 9 and 10 in Fig. 1 although only instantaneously during times of change in current state. The equivalent electrodes or terminals in this figure are shown as like primed reference characters 1', 2', 3' and 4'.

Figure 3:
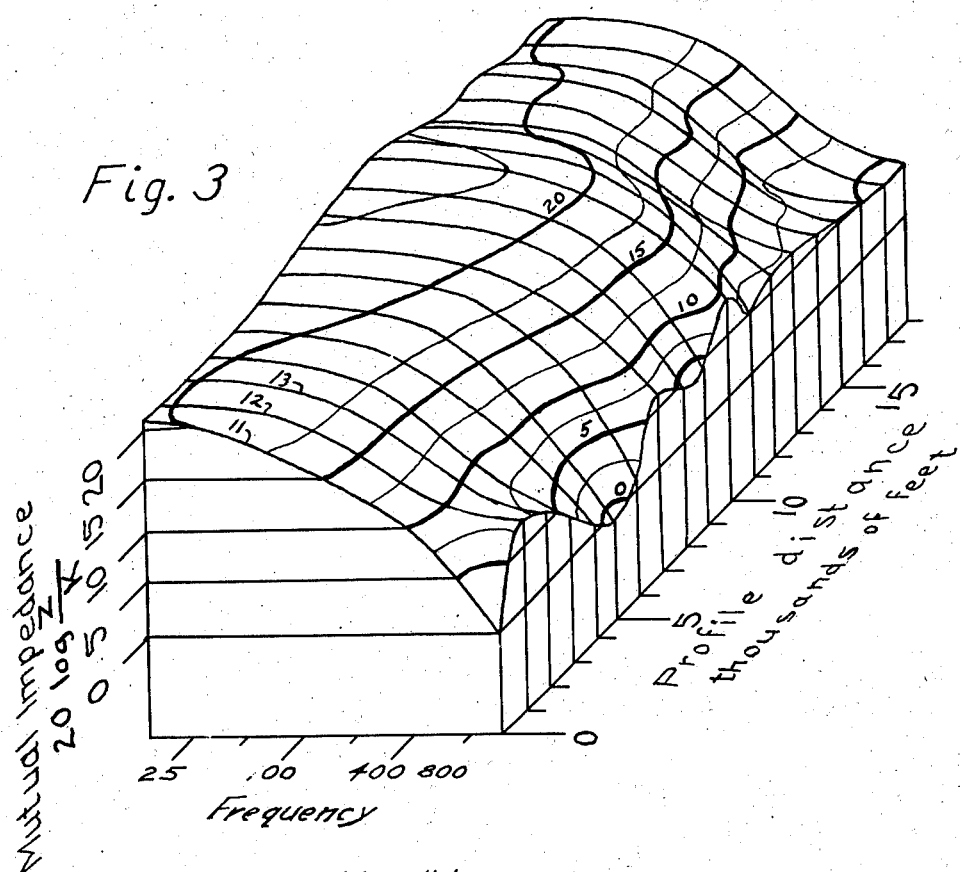
Fig. 3 is a diagram showing the mutual impedance plotted against frequency for various station locations over a profile, and is a three-dimensional illustration in which the vertical axis shows mutual impedance in appropriate units, the horizontal axis shows the frequency range, and the diagonal axis represents distance along the profile.

Fig. 3 is a three dimensional illustration of results obtainable by the invention and is constructed from data collected along a profile located over a known geological structure. The curves marked 11, 12, 13, etc. are curves of mutual impedance plotted against frequency at each station 1, 2, etc. along the profile. The impedance axis or ordinates represent values of mutual impedance expressed in logarithm units and in terms of decibels above an arbitrarily chosen zero level of 0.001 volt per ampere. The horizontal axis represents frequency in log units so that each division represents one octave change in frequency. The diagonal axis represents distance along the profile, each division representing 1000 feet of distance. The contours on the surface represent equal levels of mutual impedance or potential-current ratio, expressed in decibels above the aforementioned zero level.

Figure 4:
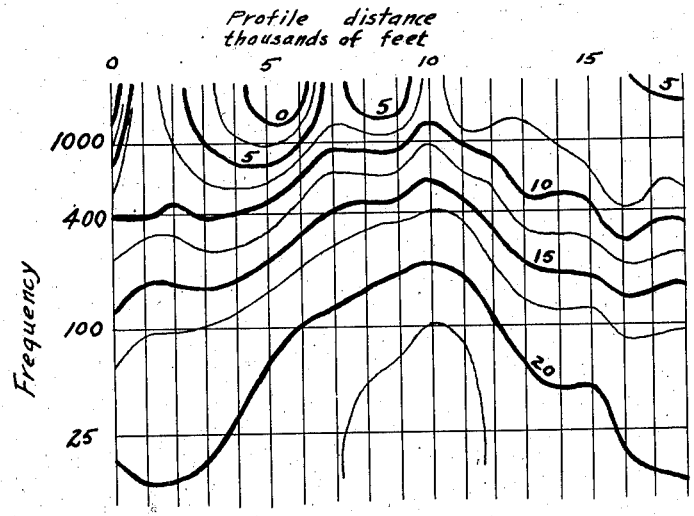
Fig. 4 is a map of the surface of Fig. 3 showing contours of equal mutual impedance.

Fig. 4 is a map of the surface shown in Fig. 3, the contours representing the variation in frequency necessary to produce a measured mutual impedance which is a constant for all stations. For example, the curves marked "15" show the variation in frequency necessary to produce a measured mutual impedance 15 decibels above the reference level of 0.001 volt per ampere.

Figure 5:
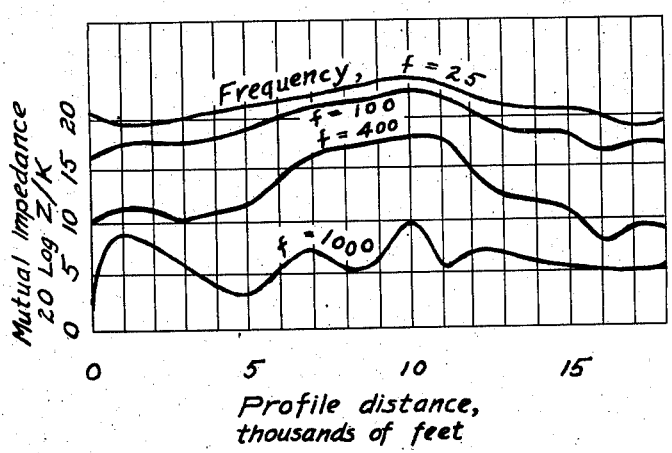
Fig. 5 is a map of the surface of Fig. 3 looked at from above showing the variation of mutual impedance along the profile at certain specific frequencies.

Fig. 5 is another map of the same surface viewed from the side, and each curve represents the mutual impedance measured at a given frequency; for example, the curve marked $f=400$ shows the mutual impedance measured at 400 cycles at the various stations along the profile, the units of mutual impedance again being in terms of decibels above the 0.001 volt per ampere reference level.

In Fig. 6 is shown a comparison of reciprocal-time-constants determined in accordance with the present invention and as measured by the means and method of the aforementioned Saibara et al. patent. The reciprocal-time-constant values have been converted into frequency units. The absolute difference between the two methods is about 30% which is not large considering all the factors involved including instrumental errors, and the personal factors which pertain to obtaining a balance with the transient method. The comparative error between the two curves is less than 5% however, except at station O which discrepancy could quite possibly have been due to an error.

Figure 7:
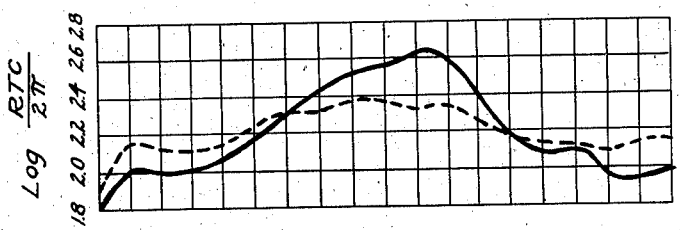
Fig. 7 shows a comparison of the reciprocal-time-constant and the variation in frequency required to give a constant mutual impedance at the various stations along the profile.

Fig. 7 is a comparison of the time-constant-data, determined by the transient method, with the frequency anomaly data of the 17.5 decibel contour of Fig. 4, the solid curve being the frequency at which the mutual impedance was 17.5 decibels above the reference level and the dotted curve being the reciprocal-time-constant converted to frequency units.

Figs. 10 and 11 graphically illustrate the relation between the transient and the alternating current steady state. The dotted curves show the transient response in inverted log-frequency units, and the solid curves represent the absolute values of frequency response which correspond to the given transient responses. As is usual the frequency response curves have been plotted with a logarithmic frequency scale, but the transient curves, departing from custom have been plotted with the time axis inverted so that the reciprocal of time progresses to the right, and the log units have been used so there is a correspondence between the frequency and reciprocal time scales.

The transients of Figs. 10 and 11 have been plotted in the customary way in Fig. 8 where curve 16 shows the transient of Fig. 10 and curve 17 shows the transient of Fig. 11, both recognizable as transients frequently met with in earth current transient prospecting. It will be observed from these curves (Figs. 10 and 11) that there is a close enough similarity to enable the time constant to be estimated with a reasonable degree of accuracy from the frequency response curves, as close perhaps as from actual transient measurements. It should be noted that the slope of the frequency response curves is greater than the slope of the transient curves, a fact which enables a greater contrast to be attained with the steady state method than with the transient method. It was from the frequency response curves of Fig. 3 that the reciprocal-time-constant curve of Fig. 6 (curve marked "A. C. steady state") was determined.

If the phase angle of the alternating current steady state response is measured along with the magnitude, more rigorous methods of determining the transient response may be employed as was done by Gould in the aforementioned paper.

From the foregoing, it is evident that by using currents of different frequencies, it is possible to determine to any desired degree of accuracy the quantities which would be measurable directly with a square wave or transient, including the time-constant.

As a method of prospecting however, there are other quantities dimensionally the same as the reciprocal-time-constant but which in some cases offer more contrast over a given profile than the reciprocal-time-constant. Thus in Fig. 7 is a comparison of the reciprocal-time-constant value compared with the frequency necessary to be used in order to measure a constant mutual impedance at the various stations. This frequency anomaly is in the same units since frequency has the dimension of the reciprocal of time, and the time constant has the dimension of time. The improved contrast is obvious.

Another quantity that can profitably be measured is the mutual impedance at a selected frequency. In Fig. 5 is shown the values of mutual impedance measured at various frequencies. The best contrast is seen to have been measured at 400 cycles, the curve for 25 and 100 cycles showing smaller variations. The curve for 1000 cycles is very rough and erratic, and apparently meaningless as far as the anomaly in question is concerned.

An examination of Fig. 3 will reveal that 400 cycles is the frequency which for all stations shown cuts the figure where the slope downward to the right is a maximum. Thus high contrast prospecting can be conducted using a single frequency if that frequency is selected so that for most or all the stations on a prospect that frequency falls on the amplitude-frequency response curve within a range of frequencies where the slope is decidedly negative or is at a negative maximum. I prefer to choose that frequency such that the slope of the curve is at least nearly at its negative maximum value when increasing frequencies are plotted to the right and increasing values of mutual impedance are plotted upwards.

In the practice of the invention, the spread, or distance between electrodes is of importance. With a given spread and resistivity, a definite frequency range will be required to produce a frequency response curve which flattens to the left and has adequate slope to the right for optimum contrast. In the example shown, the spread between current electrodes was 1000 feet, the spread between potential electrodes was likewise 1000 feet, and the distance between the nearest current and potential electrodes was 500 feet. For a spread of 1000 feet between center electrodes it would be expected that a frequency range of from about 6 cycles to about 250 cycles would have been needed.

In another area where the average resistivity is twice as great as that in the example cited, the frequency range when using the same spreads should probably be in the order of 50 to 2000 cycles. For the same frequency range used in the example a spread of about 700 feet would have been appropriate in such an area. With a given set of equipment having the frequency range used in the example, I prefer to adjust the spread so as to obtain curves of frequency response of the shapes shown. Generally speaking the frequency range depends upon the reciprocal of the square of the spread and directly upon the resistivity or, in other words, the spread depends upon the square root of the reciprocal of the frequency and upon the square root of the resistivity.

To illustrate the relation between frequency range, spread and resistivity, a curve of frequency response or mutual impedance plotted against frequency is shown in Fig. 9 plotted in dimensionless units, based on computations for a homogeneous earth, and a distance $a$ between collinearly spaced electrodes for each of the three spaces between electrodes. The ordinates are expressed in terms of the dimension $a$, the mutual impedance Z and the resistivity $\rho$ in such form that the quantity $aZ/\rho$ is dimensionless since $a$ has the dimension of length, L, Z has the dimension of resistance R, and $\rho$ has the dimension of resistance times length RL, so that $aZ/\rho = LR/LR$ and is hence dimensionless.

The abscissa is plotted in units of the product of the square of the spread times the ratio of frequency to resistivity which is therefore also dimensionless since frequency $f$ has the dimension of reciprocal time or $T^{-1}$ and P has the dimension $L^2 T^{-1}$ so that $a^2 f/\rho = L^2 T^{-1}/L^2 T^{-1}$.

The curve of Fig. 9 is distinctly an idealized curve, to be expected to be met with only approximately in practice since ordinarily the resistivity varies with depth and also changes along the horizontal. However, it does show that for a given resistivity range, the spread must be adjusted in terms of the square root of the frequency, and with a given frequency range the spread must be adjusted in terms of the reciprocal of the square root of the resistivity, in order that the desired range of frequencies will be caused to fall on the desired range of the curves actually encountered.

The essence of the present invention lies in the determination of a frequency, or a frequency range, which may be profitably employed to give electrical prospecting data with higher contrast and greater reliability than would be obtained by the use of frequencies outside this range. The determination of this frequency range depends upon the use of a given range of frequencies and different spreads to determine the curves of mutual impedance against frequency at various stations over an area to be prospected, and then selecting the particular frequency or range which gives rise to such mutual impedance-frequency curves possessing a substantially flat top, a knee and a downwardly sloping portion. The particular frequency or frequencies are then selected from the range on the curves where the slope is appreciable and preferably a maximum, or else a point on the curve which is either at constant level (mutual impedance) at the various stations, or is a constant ratio down from the maximum above the knee of the curve. Such a determination at a few stations will lead to information which makes possible economical prospecting at a single spread for the remaining stations in a given geological province.

In the example shown, the slope of the mutual impedance-frequency curves does not become positive within the range of frequencies used. However, profiles have been run at various spreads and frequency ranges in which the response curves frequently were found to turn upward when the frequency become high enough. It is important in the practice of the invention to select the frequencies below any such region of positive slope, even in the range where the slope is leveling off into a lower knee as, for example around 1000 cycles in the profile illustrated here, results are apt to be very erratic as shown by the 1000 cycles curve of Fig. 5.

After the essential step of determining the frequency range in which it is necessary to work or determining the spread necessary to meet the conditions of available frequencies and existing resistivities, there are three measurements which can be profitably made. One of these is the determination of the reciprocal-time-constant, another is the determination of the mutual impedance at a single fixed frequency within the optimum range, and the third is the determination of that frequency which gives rise to a constant value of mutual impedance measured at the various stations. These three measurements are illustrated respectively; reciprocal-time-constant in Fig. 6, mutual impedance at a single optimum frequency in Fig. 5 (curve of 400 cycles) and the frequency for constant mutual impedance in Fig. 4. Still another use to which the invention may be put is the determination of equivalent direct current resistivities by the use of a frequency below the value at or above the knee of the curve. Here again it is necessary to determine the shape of the mutual impedance frequency curve or the value of a few points on the curve in order to be sure the frequency used is below that value of frequency represented by the top of the knee of the curve. I prefer to work in the higher range of frequencies, however, because of the greater contrast.

The objection may be raised that the utility of the method is reduced when the spreads subtended by the respective pairs of electrodes are shortened in order to be able to use a given frequency range. In some cases it may be better to reduce the frequency range rather than the spread. In the majority of cases, however, and in all the cases where this method has its greatest value, the reduced depth of penetration due to the shortened spread is not of serious consequence, since the method is most applicable in the art of shallow stratigraphic prospecting where the shallow evidence of deeply buried deposits are sought for rather than the deposits themselves. See, for example, "Shallow stratigraphic variations over Gulf Coast structures," by E. E. Rosair, Geophysics III, 2, March, 1938. Experiments subsequent to this paper show generally that the conclusions reached in that paper are applicable to other geological provinces.

Obviously the same principles may be applied to well logging wherein electrodes are lowered into a drilled well and resistivities determined to indicate the nature of strata traversed. Instead of measuring the resistivity, steady state alternating may be employed and a frequency used which is high enough to result in a curvilinear relation between mutual impedance and frequency whereby a higher contrast will result than would be the case with direct current. In other words, the arrangement of Fig. 1 may be turned vertically, or a pair of electrodes may be arranged horizontally and the other pair arranged to be lowered into a bore hole, and the invention practiced just as in the case of horizontal prospecting to which attention has been directed in the greater part of this specification.

What is claimed:

1. The method of geoelectric prospecting in which the electrical transmission properties of the earth are measured comprising the steps of, causing an alternating current of known amplitude to flow in a region of the earth's crust, detecting and measuring the magnitude of a potential between points subjected to the flow of current, and varying the frequency of the current between such limits that the detecting and measuring step reveals the frequency range within which the slope of the curve of mutual impedance with respect to frequency is negative.

2. The method of geoelectric prospecting in which the electrical transmission properties of the earth are measured comprising the steps of, causing an alternating current of known amplitude to flow in the earth between points located substantially on the earth's surface, detecting and measuring the magnitude of potential between points collinearly spaced from the current points and lying on an extended line passing through said current points, and varying the frequency of the current between such limits that the detecting and measuring step reveals the frequency range where the slope of the curve of mutual impedance with respect to frequency is negative.

3. The method of geoelectric prospecting in which the electrical transmission properties of the earth are measured comprising the steps of, causing an alternating current of known amplitude to flow in a region of the earth's crust, detecting and measuring the magnitude of a potential between points subjected to the flow of current, varying the frequency of the current, and adjusting the spacing between the nearest current and potential points until the region of greatest negative slope of the curves of mutual impedance plotted against frequency falls within an arbitrary frequency range.

4. The method of geoelectrical prospecting in which the time constant of the earth acting as a four terminal electrical transmission medium is measured comprising the steps of, causing an alternating current of known value to flow in a region of the earth's crust, detecting and measuring the magnitude of a potential between points subjected to the flow of current, varying the frequency of the current throughout a range of frequencies of which the lowermost gives rise to a substantially constant measured potential-current ratio, and measuring the potential-current ratio during the varying step, such range of frequencies including a specific frequency at which the ratio is a predetermined fraction of the ratio at said lowest frequency, such specific frequency being related to the reciprocal-time-constant of the earth by a simple constant.

5. The method of geoelectric prospecting in which the electrical transmission properties of the earth are measured comprising the steps of, causing an alternating current to flow in a region of the earth's crust, detecting and measuring the magnitude of a potential between points subjected to the flow of current, varying the frequency of the current between such limits that some of the higher frequencies give rise to measured mutual impedances which are materially less than the mutual impedance measured at the lowest frequency, determining the frequency range over which the mutual impedance decreases as the frequency increases, repeating the measurements at a plurality of stations, selecting a mutual impedance value which for at least most of the stations is produced by frequencies within the determined range, and determining for the various stations the frequency value required to exhibit the selected mutual impedance value.

6. The method of geoelectric prospecting in which the electrical transmission properties of the earth are measured comprising the steps of, causing an alternating current to flow in a region of the earth's crust, detecting and measuring the magnitude of a potential between points subjected to the flow of current, repeating the measurements at a plurality of stations, varying the frequency of the current between such limits that some high frequencies give rise to measured mutual impedances which are materially less than the mutual impedance measured at the lowest frequency, determining a frequency range which for the majority of the stations exhibits a negative slope of the curve of mutual impedance plotted against frequency, and determining for the stations the mutual impedances at a single frequency, said frequency being selected from within the determined frequency range.

7. The method of exploration for subsurface structural anomalies comprising the steps of causing an alternating electrical current to flow in the earth, detecting the potential between points subject to the influence of the current, repeating the test at a plurality of frequencies including a range in which the mutual impedance decreases as the frequency increases, measuring at each of the test frequencies the mutual impedance of the current and detection paths, and repeating the group of measurements at a plurality of stations to determine the variation of mutual impedance with frequency at each station for the respective frequencies as an indication of the location and extent of subsurface anomalies.

8. The method of geophysical exploration comprising the steps of causing an alternating current of known amplitude to flow between points on the earth's surface, detecting the potential difference between spaced points in the area of current conduction, varying the frequency of the current, to determine the frequency below which there is no substantial change in mutual impedance, and measuring the mutual impedance at a plurality of stations while utilizing the determined frequency.

9. The method of geophysical exploration comprising the steps of causing an alternating current of known amplitude to flow between points on the earth's surface, detecting the potential difference between spaced points in the area of current conduction, varying the frequency of the current, measuring the mutual impedance at a plurality of frequencies repeating the measurements at a plurality of stations, and determining at each station the frequency which produces a constant mutual impedance.

10. The method of geophysical exploration comprising the steps of, causing an alternating current of known amplitude to flow between points on the earth's surface, detecting the potential difference between spaced points in the area of current conduction, varying the frequency of the current to determine the frequency below which there is no substantial change in mutual impedance, determining the optimum spread giving rise to a frequency response curve which includes a range in which the response decreases as the frequency increases within an arbitrary frequency range, and measuring the mutual impedance at a plurality of stations at the determined frequency and spread.

11. The method of geoelectric prospecting in which the electrical transmission properties of the earth are measured comprising the steps of, causing an alternating current to flow in a region of the earth's crust, detecting and measuring the magnitude of a potential between points subjected to the flow of current, varying the frequency of the current over a range within which the mutual impedance decreases with increasing frequency, repeating the measurements at a plurality of station locations, and determining at each station the frequency which gives rise to a selected value of mutual impedance at each station.

12. The method of geoelectric prospecting in which the electrical transmission properties of the earth are measured comprising the steps of, causing an alternating current to flow in a region of the earth's crust, detecting and measuring the magnitude of a potential between points subjected to the flow of current, varying the frequency of the current and the spread between the current and detection points until a spread is determined which results in a decrease in mutual impedance as the frequency is increased from an arbitrary lower limit to an arbitrary upper limit, repeating the test at a plurality of locations with the determined spread and the arbitrary frequency range, and determining at each location the frequency which will produce a selected value of mutual impedance at each of the stations.

PAUL W. KLIPSCH.